(No Model.) 4 Sheets—Sheet 2.
E. B. PHILLIPS.
MOTOR GEARING FOR ELECTRIC CARS.
No. 468,526. Patented Feb. 9, 1892.
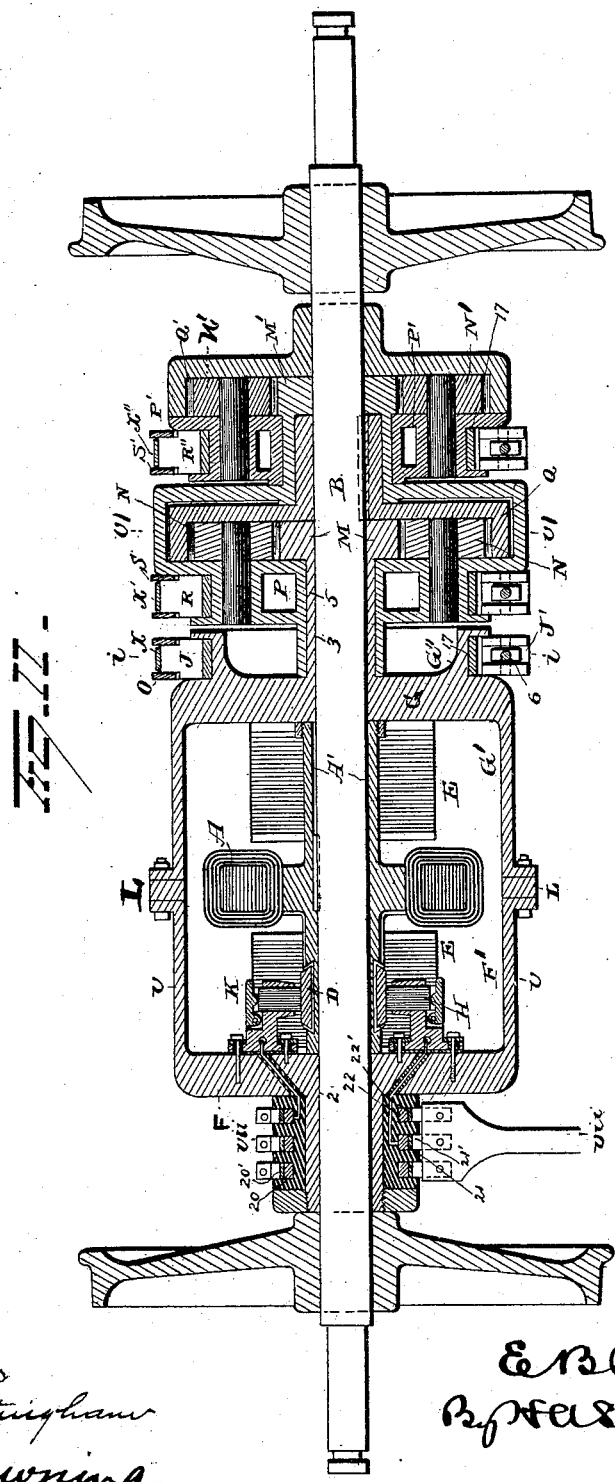
Witnesses
Inventor
E. B. Phillips
Attorney (No Model.) 4 Sheets—Sheet 3.
E. B. PHILLIPS.
MOTOR GEARING FOR ELECTRIC CARS.
No. 468,526. Patented Feb. 9, 1892.
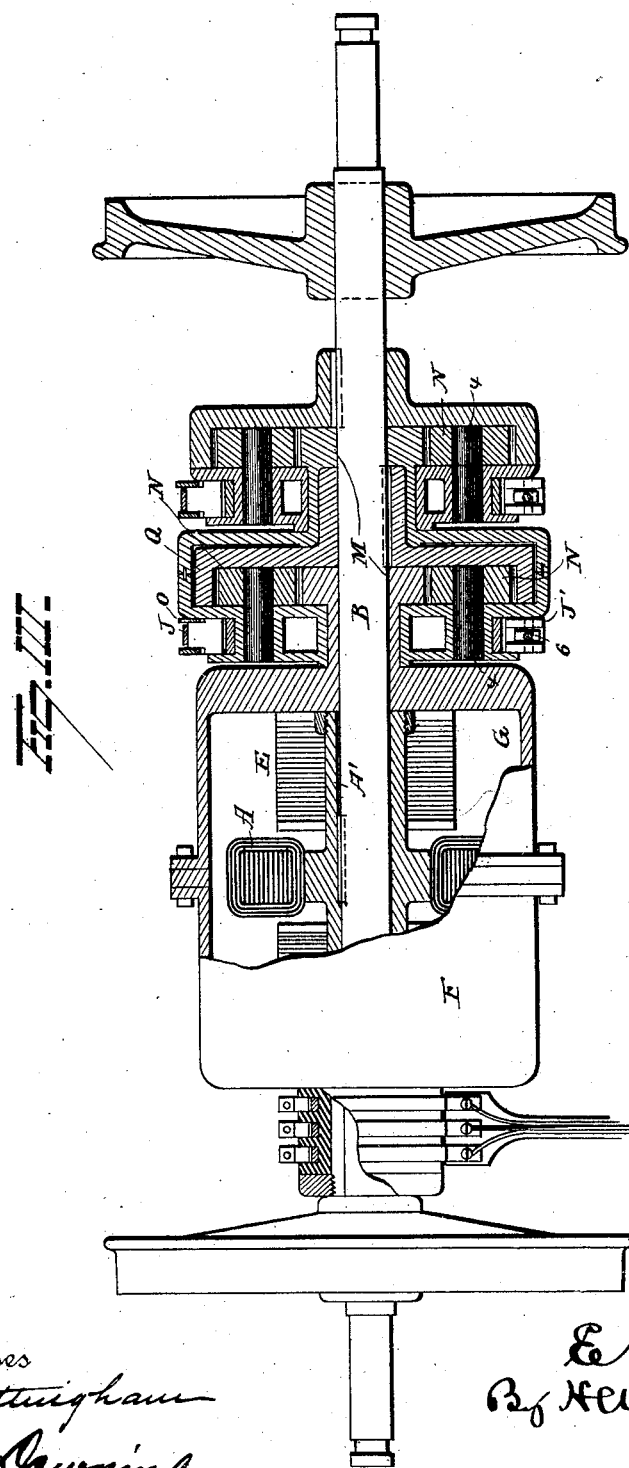
Witnesses
E. J. Nottingham
G. F. Downing
Inventor
E. B. Phillips.
By H. C. Simpson
Attorney (No Model.) 4 Sheets—Sheet 4.
E. B. PHILLIPS.
MOTOR GEARING FOR ELECTRIC CARS.
No. 468,526. Patented Feb. 9, 1892.
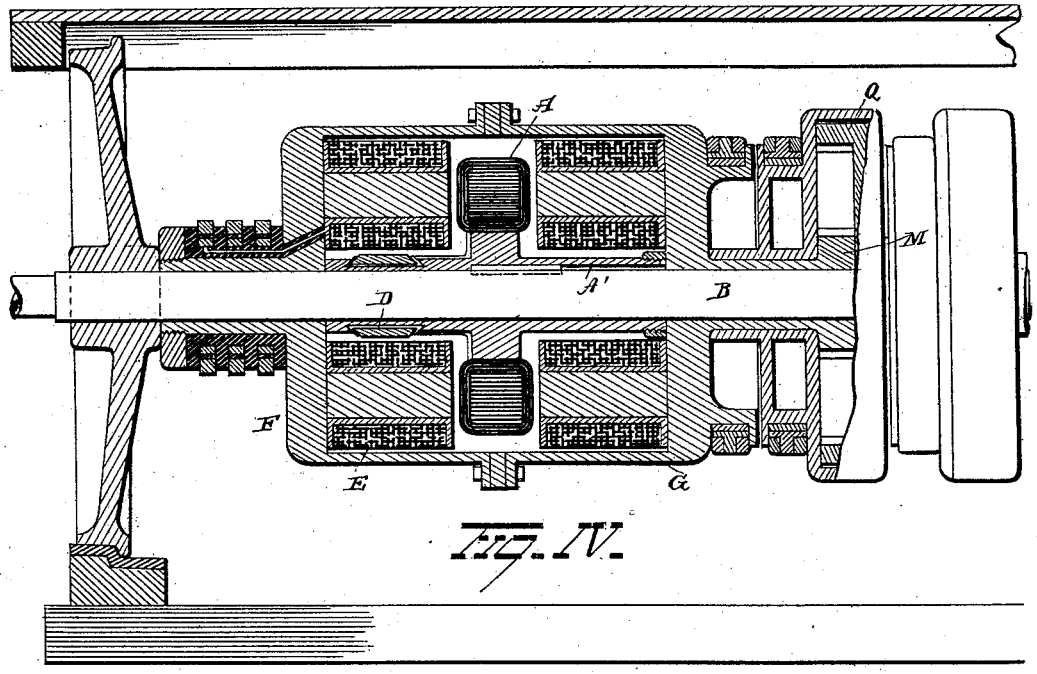
*Fig. IV.*
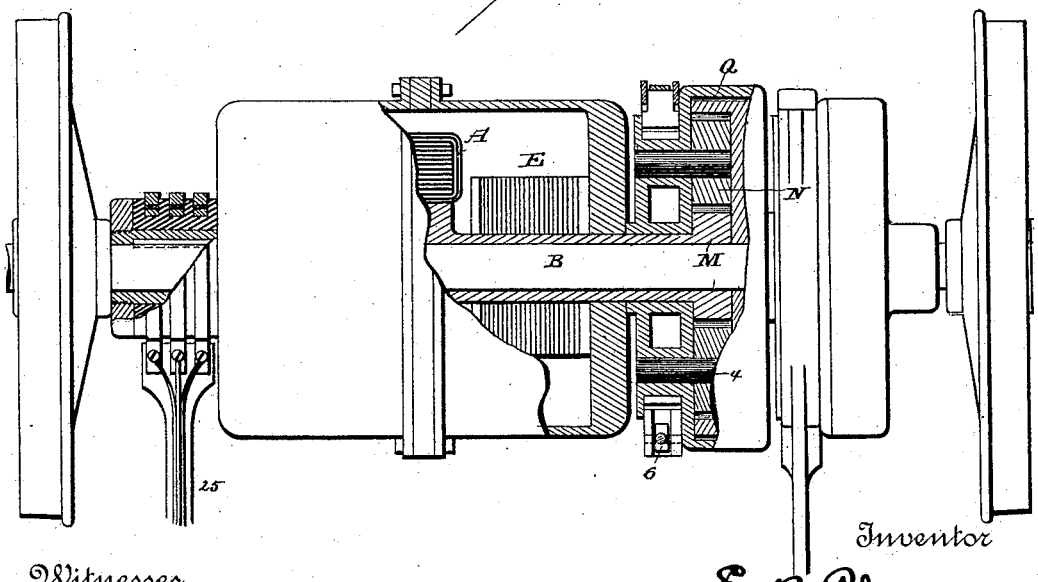
*Fig. VIII.*
Witnesses
Inventor
E. B. Phillips
Attorney

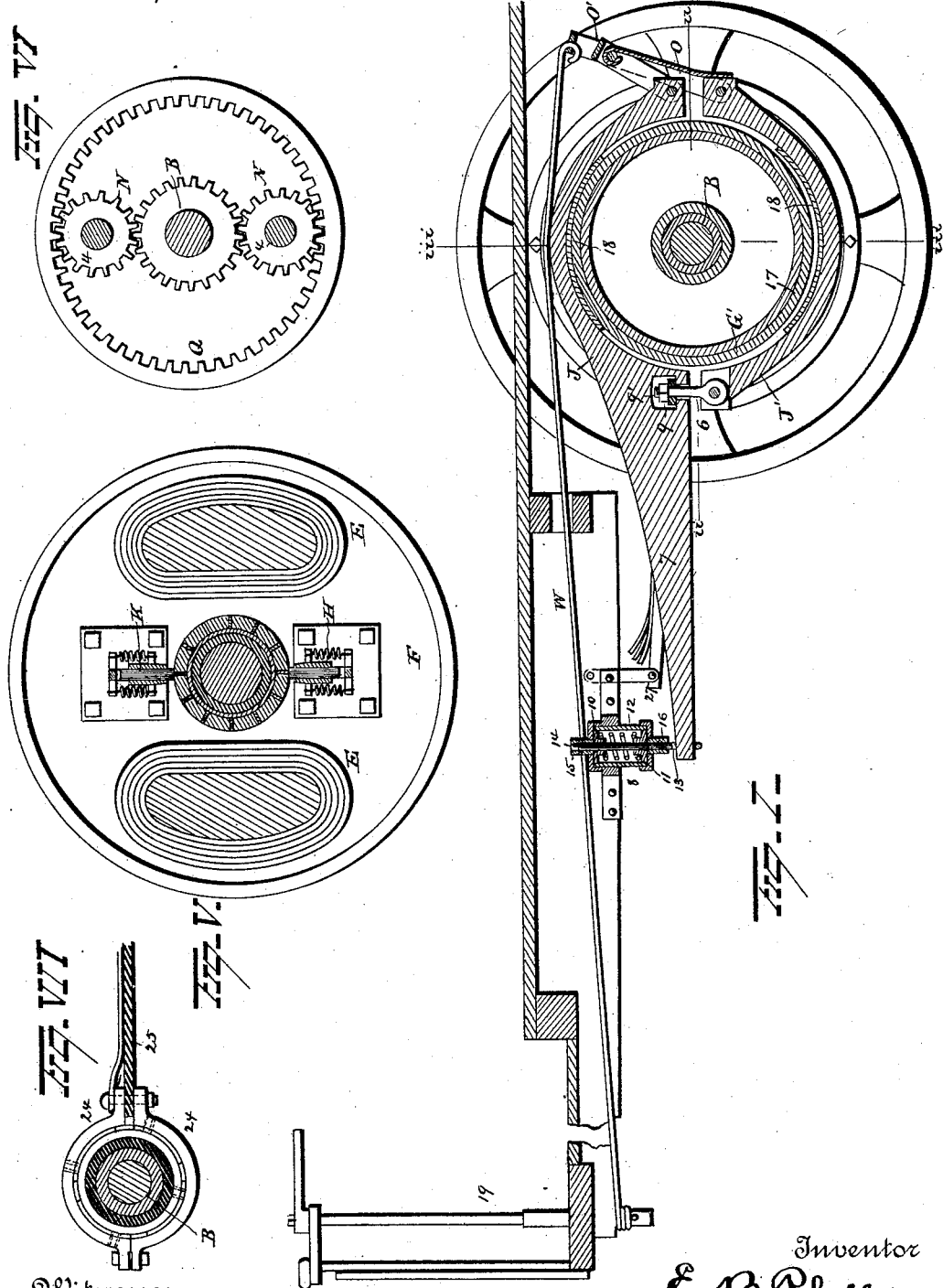

UNITED STATES PATENT OFFICE.

ELBERT B. PHILLIPS, OF CLEVELAND, OHIO.

MOTOR-GEARING FOR ELECTRIC CARS.

SPECIFICATION forming part of Letters Patent No. 468,526, dated February 9, 1892.

Application filed January 6, 1891. Serial No. 376,923. (No model.)

*To all whom it may concern:*

Be it known that I, ELBERT B. PHILLIPS, of Cleveland, in the county of Cuyahoga and State of Ohio, have invented certain new and useful Improvements in Motor-Gearing for Electric Cars; and I do hereby declare the following to be a full, clear, and exact description of the invention, such as will enable others skilled in the art to which it appertains to make and use the same.

This invention relates more particularly to motor-gearing for transmitting the power to a driving-axle from a propelling-motor whose armature is axially placed with reference to the driving-axle; but each of the improvements constituting the said invention is included for all the uses to which it may be adapted. By "axially placed" is to be understood that the axes of the armature and driving-axle are coincident or nearly so. The most ready means of securing such axial position is by mounting the armature on the car-axle.

In accordance with the present invention the motor is provided with two sets of gearing, so that it may propel the axle at different speeds or with more or less power, (torque,) and also with means for establishing a direct driving connection. By "direct connection" is to be understood such a connection that the driving-axle makes one revolution to each revolution of the propelling-armature. The invention extends to the above gearing with or without the means for establishing the direct connection. With a motor having an axially-placed and directly-connected armature the field-magnets may be adapted to rotate backward and the gearing be connected therewith in such a way as to transmit the power to the car-axle in the direction to rotate the same forward. By bringing into action whichever set of gearing is desired the speed of the motor relatively to the car-axle may be adapted to the special conditions. The sets of gearing may be more than two in number, if desired, and it will be understood that the expression of "two sets" is designed to include two or more. With the directly-connected armature the car may be propelled direct by holding the field-magnets stationary. Preferably the field-magnets when operating through both sets of driving-gear rotate backward or in the opposite direction to that which it is desired to rotate the car-axle, so that the effective rotation of the armature, or, in other words, the rotation of the armature and field-magnets relatively to each other, is equal to the sum of their individual motions. Each set of gearing may evidently be adapted to impart such speed as may be desired to the car-axle in proportion to the movement of the field and armature past each other. Each set of gearing is preferably adapted to increase the torque of the motor on the car-axle, and the set of gears which gives the larger increase would naturally be employed when a lower speed (as in crowded streets, for example) or a stronger pull (as ascending steep grades with heavy loads) is desired. The car can be started or, when started, made to run through either set of gearing or through the direct coupling, as may be desired. The motor may be allowed to run idly, if desired, when the car is at rest or is coasting or the like.

The invention extends to the use of any known or suitable motor and gearing in the above connection; but a motor with the field-magnets at the sides of the armature has advantages, in that the motor is or may be contained within a cylindrical space only a little larger in diameter than the armature, and is specially included in the invention.

The invention includes, moreover, special features in the matter of the gearing as follows:

First. Gearing is employed with intermediates symmetrically disposed with reference to the driving-pinions, so as to balance more or less the stress of transmission.

Second. Gearing is employed which can be engaged for the transmission of power to the axle by arresting a movable part or disengaged by releasing said part. In the ordinary clutch the dog or gripper moves with the part clutched thereby. With what is known as the "sun-and-planet gear" (or like gearing) the transmission may be made effective by holding any one of the three parts of the gearing from rotation, and upon the release of this part (the three parts being now free) the gear revolves idly.

Third. The holder or gripper for holding the field-magnets from rotation and the grippers for the respective sets of gearing are preferably each combined with a spring or buffer so arranged that when said holder or gripper takes hold it acts through said spring or buffer and thus applies the power without shock or jar.

Fourth. While the invention extends to certain combinations involving grippers or holders of any known or suitable construction, grippers of the form shown in the accompanying drawings possess special features which conduce to the more efficient operation of the motor mechanism as a whole. These improved grippers are included in the invention in combination with other elements. They will be hereinafter fully described.

In the accompanying drawings, which form part of this specification, Figure I is a partial view in sectional elevation of an electric car provided with motor-gearing in accordance with the invention, the section being taken on line $i$ of Fig. II. Fig. II is a horizontal section on line $ii$ of Fig. I. Fig. III is a similar view showing the gearing without the means for holding the field-magnets stationary. Fig. IV is a transverse section on line III of Fig. I. Figs. V, VI, and VII are sections on lines $v, vi$, and $vii$, respectively, of Fig. II; and Fig. VIII is a horizontal section, partly in plan, showing a modified arrangement.

The armature A, composed of a soft-iron strip wound upon itself and provided with bobbins wrapped about the ring thus formed in notches in the edges of said ring, or it may be an armature of other suitable construction, has a long hub A', and is, as shown in Figs. I to IV, mounted fast on the car-axle B. The extra length of hub might, however, be dispensed with. The armature A is thus not only axially placed with reference to the car-axle B, but it is also mounted thereon. It is directly connected with or coupled to said car-axle through the key or other means for making the armature fast on the axle. The commutator D is fast on the armature-hub A', or it might be directly on the car-axle. The field magnets E project from yokes F G at the sides of the armature A or other suitable arrangement of field-magnets may be adopted. The field-magnets are journaled on the car-axle at 2 and 3, so that they are free to turn thereon. As shown, the journal-bearings at 2 and 3 are in the yokes F G, which are perforated for the passage of the car-axle.

At H K are the commutator-brushes, mounted on but insulated from the yoke F. The yokes F G are suitably connected, so as to revolve together, the connection shown being effected by means of cylinders F' G', cast or formed integral with the yokes F G, and a ring L, bolted between flanges on the adjacent ends of said cylinders. The yoke G is provided with a rim G'', to be engaged by a gripper or holder J J', or the field-magnets are otherwise adapted to be engaged by a gripper or holder, so as to arrest or check the rotation of the field-magnets. The gripper shown consists of two parts or jaws J J', which are jointed together by means of an eyebolt 6 and are adapted to be drawn together to clamp the rim G'' or opened to release it. To draw the jaws J J' together different devices may be used; but, as shown, there is a lever O, jointed to the lower jaw J', and a link O', connecting the lever O and the upper jaw J, so that when the said lever is drawn in the link forces the jaws J J' together with great pressure. The gripper J J' is prevented from turning with the field-magnets by means of an arm 7, which is connected with a part of the car, (as the car-body, for example,) adapted to hold it from rotating. This arm may be of any desired length, and it is desirable to have it long, since by the increase the stress on the axle when the gripper is on is lessened.

To make the application of the gripper more gradual springs or buffers are employed at one or both of the following points—that is to say, in the connection which holds the gripper from rotating, as at 8, and in one of the connections of the gripper-jaws J J', as at 9. The spring or buffer 8 (shown as a spiral compression-spring) is interposed between two disks 10 and 11, which are loose in headed cylinder 12. The stirrup 13, which surrounds the end of arms 7, has a stem 14, with sleeves 15 and 16 fast thereon. These sleeves play through the cylinder-heads. When the arm 7 is lifted, the sleeve 16 presses up the disk 11 and compresses the spring 8. When the arm 7 is depressed, it carries down the sleeve 15 and disk 10 and compresses the spring. The cylinder 12 is fastened to the car-body. The spring or buffer 9 of, say, soft vulcanized rubber is placed under the nut on the eyebolt 6, which is jointed at the opposite ends to the jaw J'. By adjusting the nut 9' the grip of the jaws may be regulated and the interposition of the rubber 9 insures that they shall exert an elastic or yielding pressure. When the gripper has taken firm hold, the spring or buffer 8 prevents the occurrence of a shock. Renewable wearing-surfaces are shown at 17 and 18 in the form of a wooden ring 17 on the rim G' and metal shoes 18 on the jaws J J'.

The yoke G is provided with a pinion M, which engages intermediates N, mounted on journal-pins 4 on the disk P, which is journaled on the neck 5, joining the yoke G with the pinion M. The internal gear Q is fast on the car-axle, and is engaged by the intermediates N, which are symmetrically disposed about the car-axle. The disk P is adapted to be engaged by the gripper R, like the gripper J J', already described. The lever for drawing together the jaws of this gripper is shown at S. The disk P is connected with the pinion M', loose on the car-axle and engaging the intermediates N', mounted on journal-pins on the disk P', which is loose on the neck 5'. The internal gear Q' is fast on the car-axle. The gripper R'', which may be like the gripper J J' and is adapted to be closed by the lever S', is so arranged as to hold the disk P' from rotating when its jaws are drawn together.

To keep dirt from the gears and to allow them to run in oil, they may be inclosed in gear-boxes, which, as shown, are formed by adapting the disk P' to make a close joint with the gear Q', and by making a close joint between the disk P and its connection with the pinion M'.

The levers O S S' for the respective grippers may each be operated by a chain, as shown at W, for the lever O, which chain is wrapped about an upright shaft 19, like the chain of an ordinary car-brake or by other suitable means. A spring X, X', or X" may be employed to retract the respective levers O S S' and open the corresponding grippers when the chain is unwound.

The current is supplied to the field-coils and armature-coils of the motor by means of the contacts 20 and 20', 21 and 21', and 22 and 22'. The former of each of these pairs of contacts is in the form of an insulated ring on the hub of the yoke F, and the latter consists of brushes which are fastened at one end (see Fig. VII) to the two-part ring 24, which is bolted to an arm 25 of non-conducting material, as wood. The wires run to these rings 24 from the reversing-switch. The arm 25 is held from rotating by a connection 27 with the car-body.

The object of using three pairs of contacts is so that a reversing-switch may be arranged to reverse the current in the armature or in the field, as well understood. The brush K is supposed to be grounded. Any ordinary or suitable current-regulating device may be used with the motor.

The operation of the motor mechanism is as follows: In starting the car the current may be put on by the rheostat or otherwise after one of the grippers J J' or R or R" is applied. In that case the electricity tends to turn the field-magnets backward and the armature forward. If the gripper J J' has been applied, the field-magnets are held from rotation and the current tends to rotate the armature and the car-axle forward by direct transmission. If on the other hand the gripper R has been applied, the torque on the field-magnets is transmitted to the pinion M and from this through the intermediates N (which are held stationary by the gripper) to the internal gear Q and axle B in the direction to rotate the car-axle forward or in the direction in which it is desired the car to go. The field-magnets E turning backward or in the opposite direction to the armature A, the effective moment of the motor is proportionate to the forward motion of the armature in addition to the backward motion of the field-magnets. The direct torque (or reaction between the armature and field-magnets) is of course multiplied correspondingly in the transmission to the car-axle. Thirdly, if the gripper R" has been applied the torque on the field-magnets is transmitted to the pinion M' and from this to the intermediates N'. The rotation of the intermediates N tends to move the internal gear Q forward and the disk P backward. As the disk P is loose while the internal gear Q is fast on the car-axle, the effect is to produce a backward rotation of the disk P. This rotation is communicated to the pinion M', which engages the intermediates N' on the disk P', which is held stationary by the gripper R", so that the motion is conveyed to the internal gear Q' and the axle B in the direction to move the car forward. With the gripper R" applied it will be perceived that the motion of the field-magnets is more reduced in the transmission to the car-axle and a slower speed of the said axle is consequently obtained than when the gripper R is applied, while with the gripper J J' there is no reduction of the motion of the motor and the highest speed is developed. When the gripper R is applied, the second set of gearing M', N', and Q' revolve idly. When the gripper J J' is applied, both sets of gearing revolve idly. When all the grippers are released, the field-magnets and both sets of gearing revolve idly, and the car may be arrested or allowed to run by its own momentum or by gravity.

In order to start the car it is not necessary to apply any one of the grippers before turning on the current. The latter may be applied first, and its effect then is to rotate the field-magnets and also the disks P P' backward. On applying either of the grippers R or R" the momentum of the field-magnets tends to continue this backward motion, which is transmitted to one of the internal gears and car-axle in the direction to move the car forward. Owing to the construction of the gripper already explained, the aplication of the power to start the car is very gradually effected. It will further be perceived that as the gripper is applied and the revolution of the field-magnets is decreased the counter electro-motive force diminishes and the current increases automatically until it, aided by the momentum of the field-magnets, suffices to start the car.

In starting the car by the gripper J J' the effect is gradually to arrest the backward rotation of the field-magnets, thus diminishing the counter electro-motive force until the current becomes sufficient to start the car. In stopping the car the current may be cut off or it may be allowed to continue and the release of the grippers will permit the field-magnets and the disks P P' to rotate idly and the car to be stopped by means of brakes or otherwise. The grippers R and R" might be used without the gripper J J' to arrest the rotation of the field-magnets. This arrangement of two sets of gearing is shown in Fig. III.

Instead of having the field-magnets connected with the pinion M, the armature may be connected therewith, as illustrated in Fig. VIII, the field-magnets being keyed at 28 on the car-axle. This reverse arrangement, it will be understood, is included in the invention as a substitute for that first described without further specification herein.

Of the three parts or elements of the gearing shown—namely, the pinion M or M′, disk P or P′, with intermediates N or N′, and gear Q or Q′—the gripper might be applied to any one, the other two being connected with the armature and field-magnets, respectively. It is not necessary to use internal gears, since outside gears only might be used, and various other modifications in the gearing could be made without departing from the invention.

Instead of applying the motor mechanism, as shown, to the car-axle, it might be applied to any shaft which it is desired to run.

Having fully described my invention, what I claim as new, and desire to secure by Letters Patent, is—

1. The combination, with a car, of a propelling-motor, two sets of gearing for coupling the motor and axle to drive the latter at different speeds and means whereby the power of the motor may be applied direct, substantially as described.

2. The combination, with a car, of a propelling-motor with the armature placed on the axle, two sets of gearing for coupling the motor and axle to drive the latter at different speeds, and means whereby the power of the motor may be applied direct, substantially as set forth.

3. The combination, with a car, of a propelling-motor having an axially-placed armature and two sets of gearing, through either of which the motor may be coupled to the car-axle, substantially as described.

4. The combination, with a car, of a propelling-motor having its armature and field-magnets both mounted on a car-axle, two sets of gearing, through which the motor may be coupled to the car-axle to drive the latter at different speeds, and means whereby the power of the motor may be applied direct, substantially as described.

5. The combination, with a car, of a propelling-motor having the armature and field-magnets both mounted on a car-axle, and two sets of gearing, through either of which the motor may be coupled to the car-axle, substantially as described.

6. The combination, with a car, of a propelling-motor having a rotatable armature and rotatable field-magnets, two sets of gearing between one member of the motor and the car-axle adapted to be engaged to drive the car-axle at different speeds, and means whereby the power of the motor may be applied direct, substantially as described.

7. The combination, with a car, of a propelling-motor having a rotatable armature and rotatable field-magnets and two sets of gearing between one member of the motor and the car-axle, either of which may be engaged, substantially as described.

8. The combination, with a car, of a propelling-motor having a rotatable armature axially placed and directly connected and rotatable field-magnets, a gripper or holder for preventing the rotation of the field-magnets, and two sets of gearing between the field-magnets and axle and adapted to be engaged so as to drive the car-axle at different speeds, substantially as described.

9. The combination, with a car, of a propelling-motor having a rotatable armature axially placed and directly connected and rotatable field-magnets, and two sets of gearing between the field-magnets and axle and adapted to be engaged so as to drive the car-axle at different speeds, substantially as described.

10. The combination, with a car, of a propelling-motor having an axially-placed and directly-connected rotatable armature and rotatable field-magnets, a gripper or holder for preventing the rotation of the field-magnets, and two sets of gearing between the field-magnets and axle and adapted to be engaged so as to drive the car-axle forward at different speeds by the rotation of the field-magnets backward, substantially as described.

11. The combination, with a car, of a propelling-motor having an axially-placed and directly-connected rotatable armature and rotatable field-magnets, and two sets of gearing between the field-magnets and axle and adapted to be engaged so as to drive the car-axle forward at different speeds by the revolution of the field-magnets backward, substantially as described.

12. The combination, with a car, of a propelling-motor, two sets of gearing through which the motor may be coupled to the car-axle, and grippers for the motor and gearing, whereby said motor may be engaged with the car-axle, so as to drive the same direct or through either set of gearing, substantially as described.

13. The combination, with a car, of a propelling-motor provided with a direct connection with a car-axle and also with two sets of driving-gear and adapted to drive the said axle directly or through either set of gearing and having the axis of the armature coincident with the car-axle, and the field-magnets at the sides of the armature, substantially as described.

14. The combination, with a car, of a propelling-motor with two sets of driving-gear and adapted to drive the said axle through either set of gearing and having an armature axially placed with reference to the said car-axle and the field-magnets at the sides of the said armature, substantially as described.

15. The combination, with a car, of a propelling-motor having an axially-placed and directly-connected rotatable armature and rotatable field-magnets projecting at the sides of the armature from yokes, with openings therein for the passage of the car-axle, a gripper or holder for preventing the rotation of the field-magnets, and two sets of gearing for coupling the motor with the axle and adapted to be engaged so as to drive the car-axle at different speeds, substantially as described.

16. The combination, with a car, of a propelling-motor having an axially-placed and directly-connected rotatable armature and rotatable field-magnets projecting at the sides of said armature from yokes, with openings therein for the passage of the car-axle, and two sets of gearing between the field-magnets and axle adapted to be engaged so as to drive the car-axles at different speeds, substantially as described.

17. The combination, with a car, of a propelling-motor having a rotatable armature and rotatable field-magnets, gearing—such as the double sun-and-planet gear described—adapted to be put into and out of action by arresting and freeing a movable part and to vary the power transmitted, according to which part is arrested, a gripper or holder for said field-magnets, and grippers or holders for said movable parts, substantially as described.

18. The combination, with a car, of a propelling-motor having a rotatable armature and rotatable field-magnets, gearing—such as the double sun-and-planet gear described—adapted to be put into and out of action by arresting or freeing a movable part and to vary the power transmitted, according to which part is arrested, a gripper or holder for the said field-magnets, and grippers or holders for the said movable parts, said grippers having each one or more springs or buffers, substantially as described.

19. The combination, with a car, of a propelling-motor having a rotatable armature and rotatable field-magnets, gearing—such as the double sun-and-planet gear described—adapted to be put into and out of action by arresting or freeing either of two movable parts and to vary the power transmitted, according to which part is arrested, and grippers for said movable parts, said grippers having each one or more springs or buffers, substantially as described.

20. The combination, with a car, of a propelling-motor having a rotatable armature and rotatable field-magnets, gearing—such as the double sun-and-planet gear described—adapted to be put into and out of action by arresting or freeing either of two movable parts and to vary the power transmitted, according to which part is arrested, a gripper or holder for said field-magnets, and grippers or holders for said movable parts, said grippers being each composed of jaws, one at least of which has a projection, whereby it is secured to a part of the car adapted to hold it from rotation, substantially as described.

21. A motor, in combination with two sets of gearing for coupling a motor to a shaft to drive the latter at different speeds and means whereby the power of the motor may be applied directly, substantially as described.

22. A motor having a rotatable armature and rotatable field-magnets, in combination with two sets of gearing intermediate of the armature and field-magnets and the axle, which may be engaged to drive a car-axle at different speeds, and means whereby the power of the motor may be applied direct, substantially as described.

23. A motor having a rotatable armature and rotatable field-magnets in combination with two sets of gearing between one member of the motor and a shaft and means whereby the motor may be coupled to the shaft through either set of gearing, substantially as described.

24. A motor having a rotatable armature and rotatable field-magnets, in combination with a gripper or holder for preventing the rotation of the field-magnets and two sets of gearing between the field-magnets and drive-shaft adapted to be engaged so as to drive the shaft forward at different speeds by the backward rotation of the said field-magnets, substantially as described.

25. A motor having a rotatable armature and rotatable field-magnets, in combination with two sets of gearing between one member and a drive-shaft and adapted to revolve the shaft by the rotation of the armature and field-magnets in opposite directions and to impart revolutions to said shaft at different speeds, substantially as described.

26. A motor having a rotatable armature and rotatable field-magnets, in combination with gearing—such as the double sun-and-planet gear described—adapted to be put into and out of action by arresting or freeing a movable part and to vary the power transmitted, according to which part is arrested, a gripper or holder for said field-magnets, and grippers or holders for said movable parts, substantially as described.

27. A motor having a rotatable armature and rotatable field-magnets, in combination with gearing—such as the double sun-and-planet gear described—adapted to be put into and out of action by arresting or freeing a movable part and to vary the power transmitted, according to which part is arrested, and grippers or holders for both said movable parts, substantially as described.

In testimony whereof I have signed this specification in the presence of two subscribing witnesses.

ELBERT B. PHILLIPS.

Witnesses:
A. B. CALHOUN,
W. A. PALLANT.